US006628824B1

United States Patent
Belanger

(10) Patent No.: US 6,628,824 B1
(45) Date of Patent: Sep. 30, 2003

(54) METHOD AND APPARATUS FOR IMAGE IDENTIFICATION AND COMPARISON

(76) Inventor: Ken Belanger, 427 Chestnut St., Suite 1, San Francisco, CA (US) 94133

( * ) Notice: Subject to any disclaimer, the term of this patent is extended or adjusted under 35 U.S.C. 154(b) by 0 days.

(21) Appl. No.: 09/271,112

(22) Filed: Mar. 17, 1999

Related U.S. Application Data

(60) Provisional application No. 60/078,878, filed on Mar. 20, 1998.

(51) Int. Cl.⁷ .................................................. G06K 9/00
(52) U.S. Cl. ........................ 382/165; 382/218; 382/305
(58) Field of Search ................................ 382/162, 165, 382/305, 209, 217–220, 124–127; 345/700, 723; 707/1–7, 104.1; 358/500, 512, 529

(56) References Cited

U.S. PATENT DOCUMENTS

| | | | |
|---|---|---|---|
| 4,246,568 A | | 1/1981 | Peterson ..................... 382/126 |
| 5,319,472 A | | 6/1994 | Hill et al. .................... 358/500 |
| 5,537,530 A | | 7/1996 | Edgar et al. ................. 345/723 |
| 5,579,471 A | * | 11/1996 | Barber et al. ................ 345/700 |
| 5,848,189 A | | 12/1998 | Pearson et al. ............. 382/218 |
| 6,181,817 B1 | * | 1/2001 | Zabih et al. ................. 382/170 |
| 6,345,274 B1 | * | 2/2002 | Zhu et al. ...................... 707/5 |

FOREIGN PATENT DOCUMENTS

| | | | |
|---|---|---|---|
| DE | 4119489 | 6/1991 | |
| JP | 7123436 | 10/1993 | ............ H04N/9/73 |
| JP | 7283938 | 4/1994 | ............ H04N/1/40 |
| JP | 10105705 | 9/1996 | ............. G06T/7/00 |
| JP | 10187983 | 12/1996 | ............. G06T/7/00 |

OTHER PUBLICATIONS

Slater et al., The Illumination –Invariant Recognition of 3D Objects using Local Color, Dec. 1994, IEEE, vol. 18, No. 2, pp. 206–210.*

Tirkel, A.Z. et al. "Electric Water Mark," Computing: Techniques and Applications, vol. 2, pp. 666–673 (1993) Abstract.

Tirkel, A.Z. et al. "Image Watermarking–A Spread Spectrum Application," 1996 IEEE 4th International Symposium on Spread Spectrum Techniques and Applications Proceedings, Technical Program, (Cat. No. 96TH8210), vol. 2 , pp. 785–789 Abstract.

* cited by examiner

Primary Examiner—Leo Boudreau
Assistant Examiner—Ishrat Sherali
(74) Attorney, Agent, or Firm—Dergosits & Noah LLP; Michael E. Dergosits

(57) ABSTRACT

A method and apparatus are provided for analyzing, identifying, and comparing images. The method can be used with any visually-displayed medium that is represented in any type of color space. An identified image can be authenticated, registered, marked, compared to another image, or recognized using the method and apparatus according to the present invention. At least one characteristic of an image's color space is selected and determined to generate a unique description of the image. This identification information is then used to compare different identified images to determine if they are identical according to a set of predetermined criteria. The predetermined criteria can be adjusted to permit the identification of images that are identical in part. In the preferred embodiment of the present invention, a software search application, such as a search engine or a spider, is used to locate and retrieve an image to be identified from an electronic network. A notification alarm is triggered when a duplicate image is located. In one embodiment, the present invention is implemented using a computer. One or more software applications, software modules, firmware, and hardware, or any combination thereof, are used to determine the identification information for the selected image characteristics, search for images, provide notification of identical images, and to generate a database of identified images.

15 Claims, 6 Drawing Sheets

METHOD AND APPARATUS FOR IMAGE IDENTIFICATION AND COMPARISON

This application claims the benefit of Provisional application Ser. No. 60/078,878, filed Mar. 20, 1998.

FIELD OF THE INVENTION

The present invention relates generally to image identification and, more specifically, to a computer-implemented method for analyzing, identifying, and comparing images.

BACKGROUND OF THE INVENTION

With the development of computers and electronic networks such as the Internet, it is now possible to create, represent, and store, and view electronic representations of visually displayed images such as photographs, paintings, and prints. In addition to such electronic representations of "hard-copy" images, computer generated art forms that are created, stored, and viewed exclusively as electronic representations are becoming more common.

Electronic representations, such as digital images, are extremely easy to duplicate. Unfortunately, it can be difficult or impossible to determine whether an electronic image is an original image, or is a duplicate of the original. Furthermore, the Internet has greatly facilitated the transmitting of duplicated images. This can be a significant problem for artists, copyright owners, and others who have interests in particular images.

Attempts have been made to mark electronic images to permit identification of unauthorized copies. For example, a digital watermark can be added to an electronic image. A suspected duplicate image can be identified by its hidden digital watermark. However, a digital watermark is located at one or more specific locations on an electronic image. Thus, if the portion of an image in which the watermark is stored is cropped upon duplication, image identification will not be possible using the digital watermark.

Furthermore, a digital watermark must be affirmatively added to an electronic image. Therefore, it is not possible to use this method to identify copies of images that either have not been digitally watermarked, or that were made prior to the addition of a digital watermark.

In addition, a digital watermark may not survive the transfer of an electronic image to printed format. For example, a duplicate digital image can be downloaded from the Internet and printed. The unauthorized print may not display the digital watermark.

It would be an advantage to provide a method and apparatus for identifying an image without requiring the use of an identifying mark. It would be a further advantage if such method and apparatus enabled the identification of altered duplicate images, such as cropped images. It would be yet another advantage if such method and apparatus were available to search an electronic network to locate, compare, and identify images.

SUMMARY AND OBJECTS OF THE INVENTION

The present invention is a computer-implemented method and apparatus for analyzing, identifying, and comparing images. The method can be used with any visually-displayed medium that is represented in any type of color space. An identified image can be authenticated, registered, marked, compared to another image, or recognized using the method and apparatus according to the present invention.

In the present invention, an image's displayed composition is parsed to generate unique image characteristics. At least one characteristic of the image's color space is selected and determined for a displayed image. In the preferred embodiment of the invention, the selected characteristics include color distribution, color space usage, color range distance, and image size. The information determined for each selected characteristic comprises a unique description of an image. This identification information can be then used to compare different identified images to determine if they are identical.

In the preferred embodiment of the present invention, a plurality of color values are combined to provide an expressed color value. In one embodiment, the color values are combined by grouping colors that cannot be distinguished by visual inspection. In an alternative embodiment, the color values are combined by truncating a specified number of the lower bits representing each color value and then by combining all color values whose remaining bits are equal in value.

A set of predetermined criteria is used to ascertain whether a second image is a duplicate of a first image. Such criteria can include the percentage of identity of the determined characteristics of the compared image. Thus, if the determined characteristics are identical within the predetermined percentage, the images will be considered to be duplicates. The predetermined criteria can be adjusted to permit the identification of images that are identical in part, such as a clipped copy of an image compared to an original.

In the preferred embodiment of the present invention, a software search application, such as a search engine or a spider, is used to retrieve an image from an electronic network. The retrieved image can then be identified using the method of the present invention. The software search application can be used to search an electronic network, such as the Internet, to seek out copies of an identified image. In one embodiment, a notification alarm is provided when a duplicate image is located.

In one embodiment, the present invention is implemented using a computer. In this embodiment, identification information for an image can be stored in a computer-accessible database. The computer can be adapted for communication with an electronic network such as the Internet. One or more software applications are used to determine the identification information for the selected image characteristics. Software applications are also used to compare images, provide notification of identical images, and to generate a database of identified images.

DETAILED DESCRIPTION

A method and apparatus for identifying images is described. In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto.

The present invention is a method and apparatus for analyzing, identifying, and comparing images. The method can be used with any visually-displayed medium that is represented in any type of color space. The present invention can be used for purposes including but not limited identifying a particular image, authenticating an image as being identical to a particular image, registering an image, for example with a registry, organization, database, or digital library, marking an image for subsequent identification, or identifying copies of a particular image.

In one embodiment, the present invention is implemented using a computer. Such computer can include but is not limited to a personal computer, network computer, network server computer, dummy terminal, local area network, wide area network, personal digital assistant, work station, minicomputer, and mainframe computer. The identification, search and/or comparison features of the present invention can be implemented as one or more software applications, software modules, firmware such as a programmable ROM or EEPROM, hardware such as an application-specific integrated circuit ("ASIC"), or any combination of the above.

Figure 1:
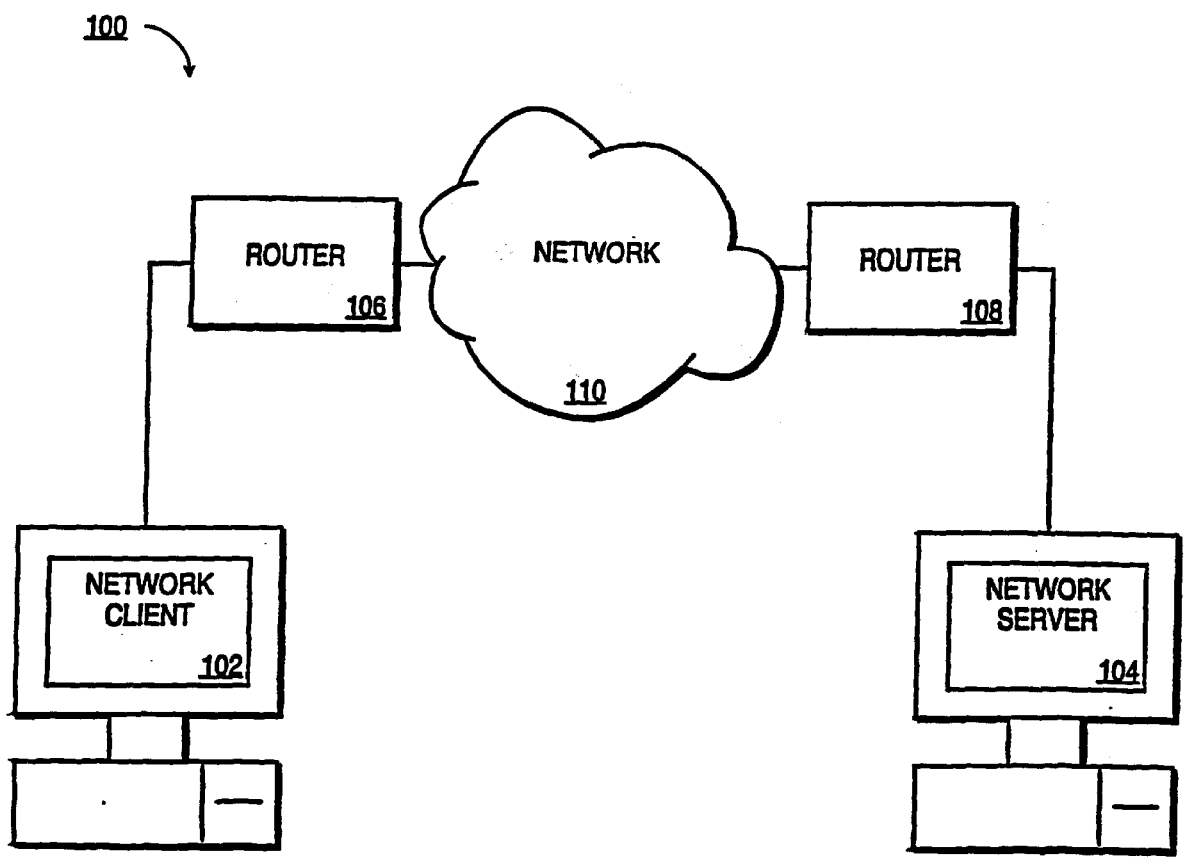
FIG. 1 is a block diagram of a computer network according to one embodiment of the present invention.

FIG. 1 is a block diagram of a computer network system 100 according to one embodiment of the present invention. In computer network system 100, a network server computer 104 is connected to a network client computer 102 through a network 10. The network interface between server computer 104 and client computer 102 can also include one or more routers, such as routers 106 and 108. The routers serve to buffer and route the data transmitted between the server and client computers. Network 10 may be the Internet, a Wide Area Network (WAN), a Local Area Network (LAN), or any combination thereof. In one embodiment of the present invention, the server computer 104 is a World-Wide Web (WWW) server that stores data in the form of 'web pages' and transmits these pages as Hypertext Markup Language (HTML) files over the Internet network 110 to client computer 102. It should be noted that, although only one server and client computer each are illustrated in network system 100, a network that implements embodiments of the present invention may include a large number of interconnected client and server computers.

For example, one or more software applications accessible to a computer can be used to determine the identification information for the selected image characteristics. Software applications can also be used to compare images, provide notification of identical images, and to generate a database of identified images. Any or all of the software applications or hardware configurations of the present invention can be implemented by one skilled in the art using well known programming techniques and hardware components.

The original data source for the original reference image, and for any subsequently-identified comparison images can be in any appropriate form, including but not limited to processed film (black-and-white, color, or negatives), video, CD, CD-ROM, photographs, optical disks, magazines, brochures, newspapers, books, paintings, and computer images. Computer image data sources can be stored in any format including but not limited to JPG, GIF, TIFF, PNG, PCX, MacPaint, GEM, IFF/ILBM, Targa, Microsoft Windows Device Independent Bitmap, WordPerfect Graphics, Sun Raster files, PBM, X Windows bitmaps, FITS, DXF, HPGL, Lotus PIC, UNIX plot format, PCL, Basic PostScript graphics, WMF, PICT, CGM, RIB, FLI/FLC, MPEG, QuickTIme animations, Kodak ICC, PDS, RIFF, SGI, XPM, HP Paintjet, PC Paint, Utah RLE, VICAR, and XPM.

In one embodiment, the present invention is a vendor-provided service, with the image identification, search, and any image comparisons performed by the vendor for use by users or customers. In this embodiment, the software applications, firmware, and hardware for implementing the invention reside with the vendor. A user can electronically access information previously obtained by the vendor, can request that a search be performed for specific information, and can provide an image for comparison with a database, file, library of stored images, or any other image. In one embodiment, the user provides an image for identification by the vendor. The vendor stores the identification information for this image and searches, for example on the Internet, for duplicate images. The user is notified when a duplicate image is located.

In alternative embodiments of the present invention, the entire process and apparatus or any portion thereof can reside with one or more users or third parties. In this embodiment, the present invention can be implemented as one or more software applications, software modules, firmware, and hardware that are provided to individual users for their utilization.

Figure 2:
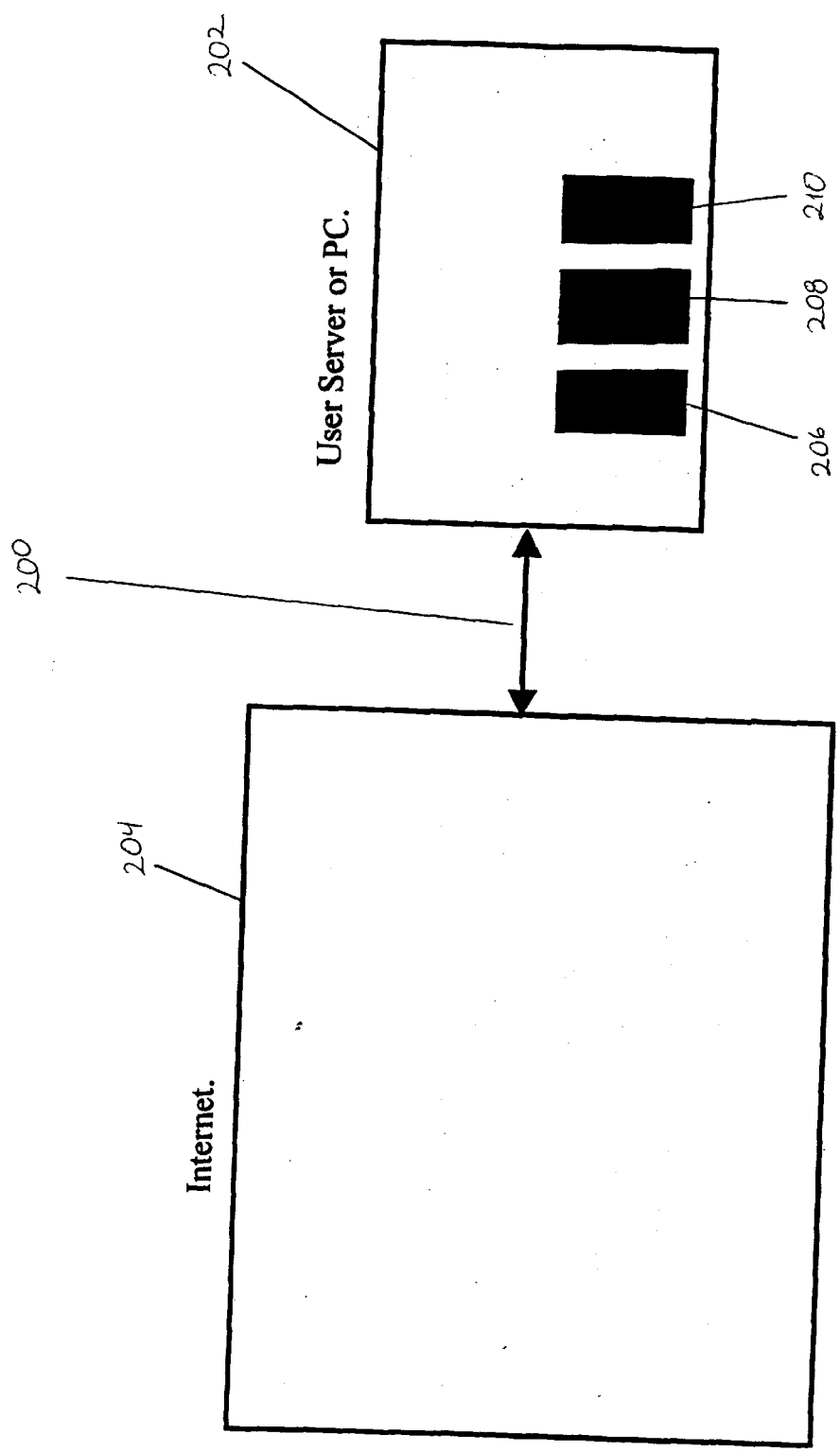
FIG. 2 is a block diagram illustrating an apparatus for accessing an electronic network, according one embodiment of the present invention.

The computer can be adapted for communication with an electronic network such as the Internet. As a result, the method according to the present invention can be used to identify images stored on an electronic network, such as images displayed on a World Wide Web ("Web") page. FIG. 2 is a block diagram illustrating an apparatus 200 for accessing an electronic network, according one embodiment of the present invention. In this embodiment, a computer 202 is adapted for communication with an electronic network 204 such as the Internet. Identified reference images 206 can be stored on the computer, for example, in a database. A spider or search engine 208, also resident on the computer, can be used to search the electronic network for images. The identification of retrieved images can then be performed using a software application 210 resident on the computer.

In an alternative embodiment of the present invention, the image identification is performed manually. Similarly, the comparison of an identified image with another image can be performed either manually, or by using a computer.

In the present invention, an image's displayed composition is parsed to generate unique image characteristics. At least one characteristic of the image's color space is selected and determined for a displayed image. The information determined for each selected characteristic comprises a unique description of an image. This identification information can be then used to compare different identified images to determine if they are identical.

In the preferred embodiment of the invention, the selected characteristics include color distribution, color space usage, color range distance, and image size. The selected characteristics can be determined in any order. In alternative embodiments, any or all of the characteristics of a color space can be used to identify an image according to the present invention. For purposes of explaining the present invention, the examples described herein use the RGB color space. However, any suitable display type or color space type can be used, including but not limited to RGB, YIQ, YUV, YDbDr, and YCbCr.

The RGB color space is an "additive" color system. In the RGB color space, all colors are represented according to the values of the red, green, and blue components required to produce each color. Each of the three component colors is divided into 256 digital steps. Therefore, black is represented as 0,0,0 and white, which contains the maximum amount of all three colors is 255,255,255.

Figure 3:
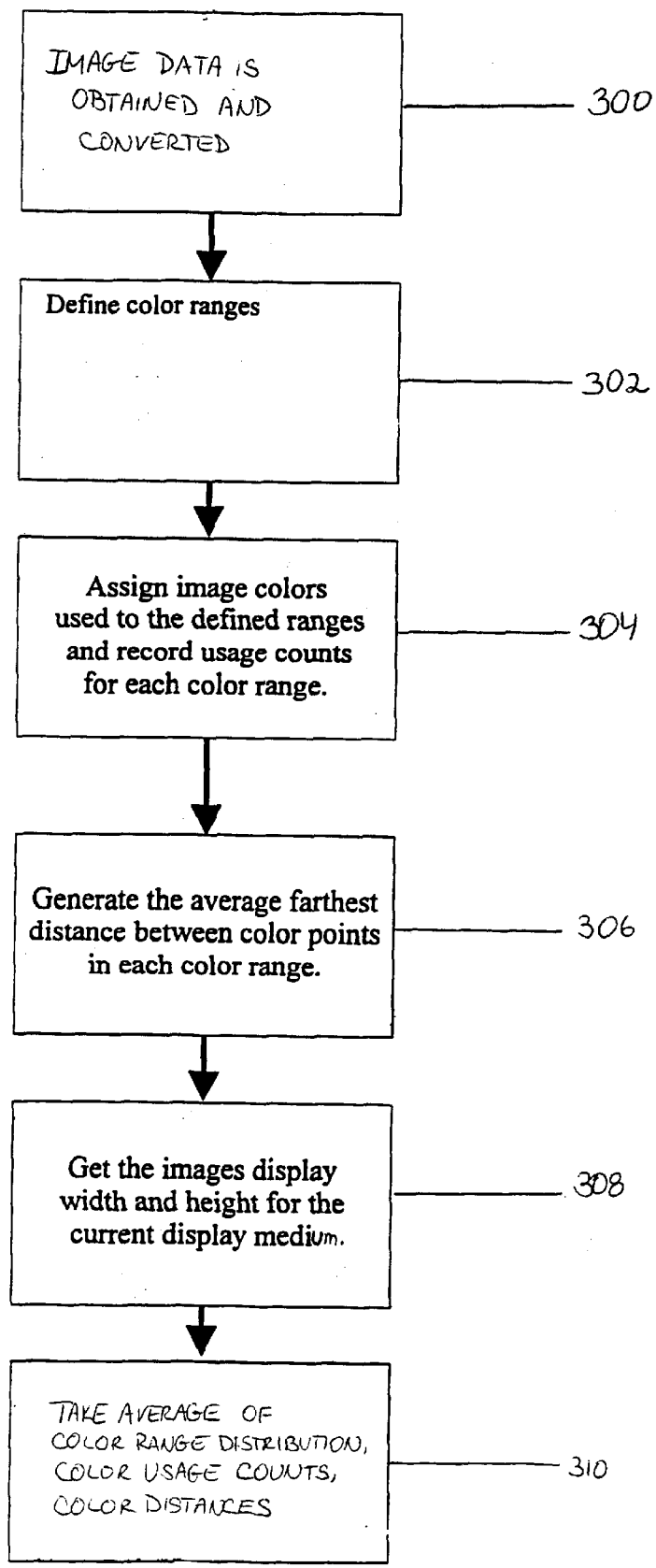
FIG. 3 is a flow chart of a method for identifying an image according to the present invention.

FIG. 3 is a flow chart of a method for identifying an image according to the present invention. The image data is obtained from the data source and, if necessary, is converted to the color space being used in the identification procedure 300. For example, a JPG file format image can be converted to the RGB color space.

Color ranges for the particular color space are then defined by divided the total color range for the particular color space into a specific number of groups 302. Image colors used in the image are assigned to their defined color ranges and color usage counts for each color range are recorded 304. The average farthest distance between color points in each color range is then derived 306. The image's display width and height for the current display medium is also determined 308.

The image is identified by taking the average of the color range distribution, color usage counts, and color distances, and by making each of the averaged characteristics relative to 100% of all characteristic ranges 310.

Figure 4:
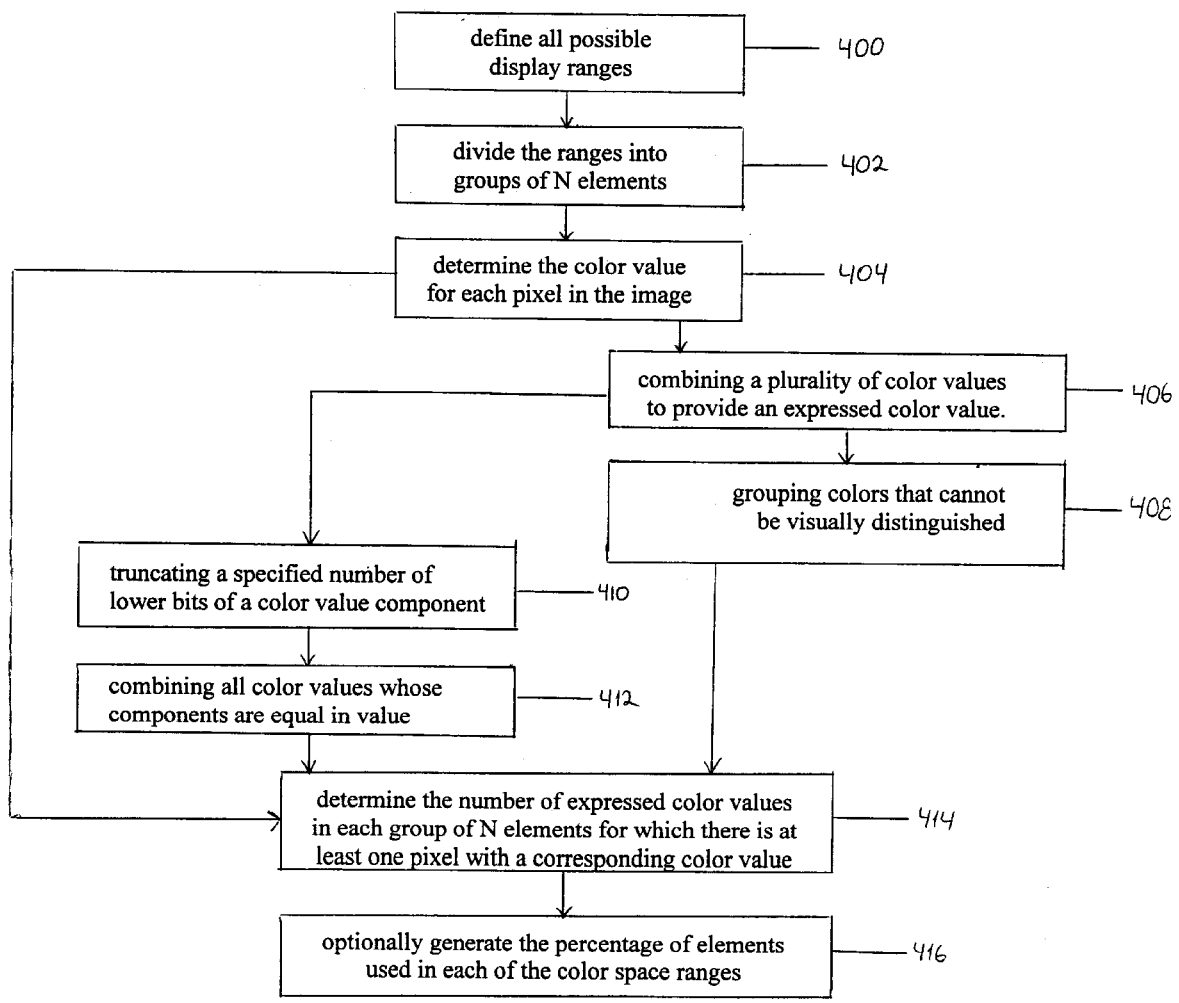
FIG. 4 is a flow chart illustrating the determination of an image's color distribution according to the preferred embodiment of the present invention.

FIG. 4 is a flow chart illustrating the determination of an image's color distribution according to the preferred embodiment of the present invention. In a first step, all possible display ranges for a media type pixel are defined 400. For a RGB color space, the display range is from 0,0,0 through 255,255,255.

Each display range is divided into groups of N elements, where N represents the total number of discreet elements desired 402. N can be any value from 1 to the maximum number of color values in a display range. For example, in an RGB color space, if N=32, then the first group of 32 elements is from 0,0,0 through 7,255,255. The second group of 32 elements is from 8,0,0 through 15,255,255. The third group of 32 elements is from 16,0,0 through 31,255,255. The remaining groups are similarly determined, with the last group of 32 elements being from 247,0,0 through 255,255, 255. The image Color Distribution can be generated using methods including but not limited to one or more software applications, a calculator, or by hand calculation. Range sizes can differ among the selected characteristics in an image identification procedure according to the present invention.

The color value is then determined for each pixel in the image 404. In the preferred embodiment of the present invention, a plurality of color values are combined to provide an expressed color value 406. In an alternative embodiment, however, no such color values are combined. The color values can be combined in several different manners. In one embodiment, the color values are combined by grouping colors that cannot be distinguished by visual inspection 408. For example, color 233,233,233 can be considered the same color as 233,233,232 or 233,232,234 for purposes of the present invention. In this example, the three visually indistinguishable colors are considered to be the same color and are counted as one instead of three colors in the color space range. This method is used to advantage in averaging out display media differences when comparing screen-captured images.

In an alternative embodiment, the color values are combined by truncating a specified number of the lower bits representing each component color value 410. The truncated component color values are re-calculated. After the truncation step, all colors having the same component color values are then combined 412. For example, the binary representation of the number 255 is 1 1 1 1 1 1 1 1. The RGB color space color 233,233,233 would therefore be represented as:
1 1 1 0 <u>1 0 0 1</u>, 1 1 1 0 <u>1 0 0 1</u>, 1 1 1 0 <u>1 0 0 1</u>.
The last four bits of each color component's value are underlined for emphasis. The last four bits of each color component's value are truncated to produce the color value:
1 1 1 0 <u>0 0 0 0</u>, 1 1 1 0 <u>0 0 0 0</u>, 1 1 1 0 <u>0 0 0 0</u>.
Similarly, the RGB color 236,236,236 is represented as:
1 1 1 0 <u>1 1 0 0</u>, 1 1 1 0 <u>1 1 0 0</u>, 1 1 1 0 <u>1 1 0 0</u>.
The last four bits of each color component's value can be truncated to also produce the color value:
1 1 1 0 <u>0 0 0 0</u>, 1 1 1 0 <u>0 0 0 0</u>, 1 1 1 0 <u>0 0 0 0</u>.
Therefore, in this preferred embodiment, the RGB colors 233,233,233 and 236,236,236 will be considered to be the same color. This method is advantageous because it allows you to create a color table of 4096 elements that can be stored and directly indexed in memory.

The number of expressed color values in each group of N elements for which there is at least one pixel with a corresponding color value is then determined 414. As an example, if the image included one pixel having the value 1,244,244, then the range 0,0,0 through 7,255,255, would have at a minimum one of its color space values used in the image. Only one color space element is considered to be used when the image includes a plurality of pixels whose color values are combined and considered to be the same color, as discussed previously.

Once all color space range elements used by pixels in the image are determined, the total number of color space range elements of each color space range can optionally be divided by the total color space range elements used in all the color space ranges 416. This will generate the percentage of elements used in each of the color space ranges.

In the following example, the total number of color ranges is two, and a total of three color elements are used:

| Range: | 0,0,0 to 127,255,255 | 128,0,0 to 255,255,255 |
|---|---|---|
| Colors Used: | 1 | 2 |
| Total Colors Used: | 1 + | 2 = 3 |
| Range %: | ⅓ = 33% | ⅔ = 66% |

In the previous example, the color space distribution is 33%, 66% for a two range color space. In alternative embodiments of the present invention, the range elements are represented by other methods including but not limited to averaging, and calculating the deviation from a specific point.

The image's color space usage is determined by, for each color range defined in the image's color space, counting the number of pixels that use a color element in the color range. Once all such pixel usage counts have been done, each color space range total pixel count can optionally be divided by the total number of pixels used in the image. This generates the percentage of usage for each specific color range of the color space. Other representational methods such as averaging or calculating deviation from a specific point can also optionally be used.

In the following example, the total number of color ranges is two, and the image has four pixels. Three pixels use colors defined in the first color range and one pixel uses a color defined in the second color range.

| Range: | 0,0,0 to 127,255,255 | 128,0,0 to 255,255,255 |
|---|---|---|
| Color Element Usage Count: | 3 + | 1 = 4 |
| Usage %: | 3/4 = 75% | 1/4 = 25% |

Color range distance is determined by determining the distance between the two farthest points of each color element defined in each color range. For example, when distance is defined as:

| Point 1 | $X_1 = 20, Y_1 = 10$ |
|---|---|
| Point 2 | $X_2 = 30, Y_2 = 15$ |
| Distance = | $|(X_2 - X_1)| \times |(Y_2 - Y_1)| = |(30 - 20)| \times |(15 - 10)| = 50$ |

The total distances for each color range are then averaged. The color range distance can be represented by any other methods such as deviation from a specific point. An example of color range distancing using averaging is as follows:

Color Range Distance=$(CRE_1+CRE_2+\ldots+CRE_N) \div$ Total CRE's for a range where CRE=Color Range Element.

Image size is derived by determining the width and height of an image. In one embodiment of the present invention, the width of an image is defined as the number of color space units used from right-to-left of the image, and the height of an image is the number of color space units used from the top-to-bottom of the image. It is readily apparent to one skilled in the art that the directions of measurement and the size of the color space units can be varied without departing from the scope and spirit of the present invention.

Once the selected characteristics of an image, such as the color distribution, color space usage, color range distance, and image size according to the preferred embodiment of the present invention are determined, this data constitutes identification information for the image. Depending on the number and type of selected characteristics, this identification information can uniquely identify the image.

In one embodiment of the present invention, the image identification information is used to identify copies of a reference image. The identification of such copies can be performed using methods including but not limited to one or more software applications, a calculator, or by hand calculation.

The identification information can be used to authenticate an image. For example, a work of computer art can be authenticated by generating the identification information according to the present invention. This authentication does not require the use of a prior art identification marker implanted within or associated with the image, such as a digital watermark. As a result, copies of an image authenticated according to the present invention can be readily identified even if the digital watermark has been cropped from the copied image.

The identification information according to the present invention can be used to authenticate, catalog, index, retrieve, identify, and register an image or images. In addition, the identification information can also be used to search for image copies including but not limited to reproductions, screen captures, and cropped areas. In one embodiment of the present invention, identification information for a reference and/or comparison image is stored in a computer-accessible database.

In the preferred embodiment of the present invention, the image identification and/or search is conducted for images stored on an electronic network, such as the Internet. However, in alternative embodiments, the teachings of the present invention can equally be applied to images stored on any type of storage or electronic storage medium, network, or system, including but not limited to CD-ROMs, Digital Video Disks, billboards, films, videos, photographs, posters, newspapers, books, and magazines. For example, a photograph can be electronically scanned and analyzed to determine its selected characteristics. The identification information thus generated for the photograph can be used to identify digital copies of the photograph that are stored on the Internet, or hard copies of the photograph on posters.

In the preferred embodiment of the present invention, a software search application, such as a search engine or a spider, is used to retrieve an image from an electronic network. For the purposes of this application, an Internet spider is a software application running on a node on a network. The spider software application is programmed to access other hosts' websites on the Internet and retrieve reference information from the HTML pages and images found on the visited sites. The retrieved data is loaded and stored on at least one database. This database can be on the same computer as the spider software application, or on another computer(s).

For the purposes of this application, a search engine is a software application that is programmed to use the retrieved data (reference information) stored in the database by the spider. The search engine locates websites that contain requested information and images that are based upon the stored reference information collected by the spider.

The teachings of the present invention can be implemented either using a proprietary or a commercially-available spider or search engine. Such commercially-available spider software applications or search engines include but are not limited to America On-Line's Web Crawler, Compaq Corporation's Alta Vista, Yahoo! Corporation's Yahoo!, InfoSeek Corporation's InfoSeek, Lycos Corporation's Lycos, and @Home Corporation's Excite. Any other search software application of other searching technique known to one skilled in the art can also be used.

Figure 5:
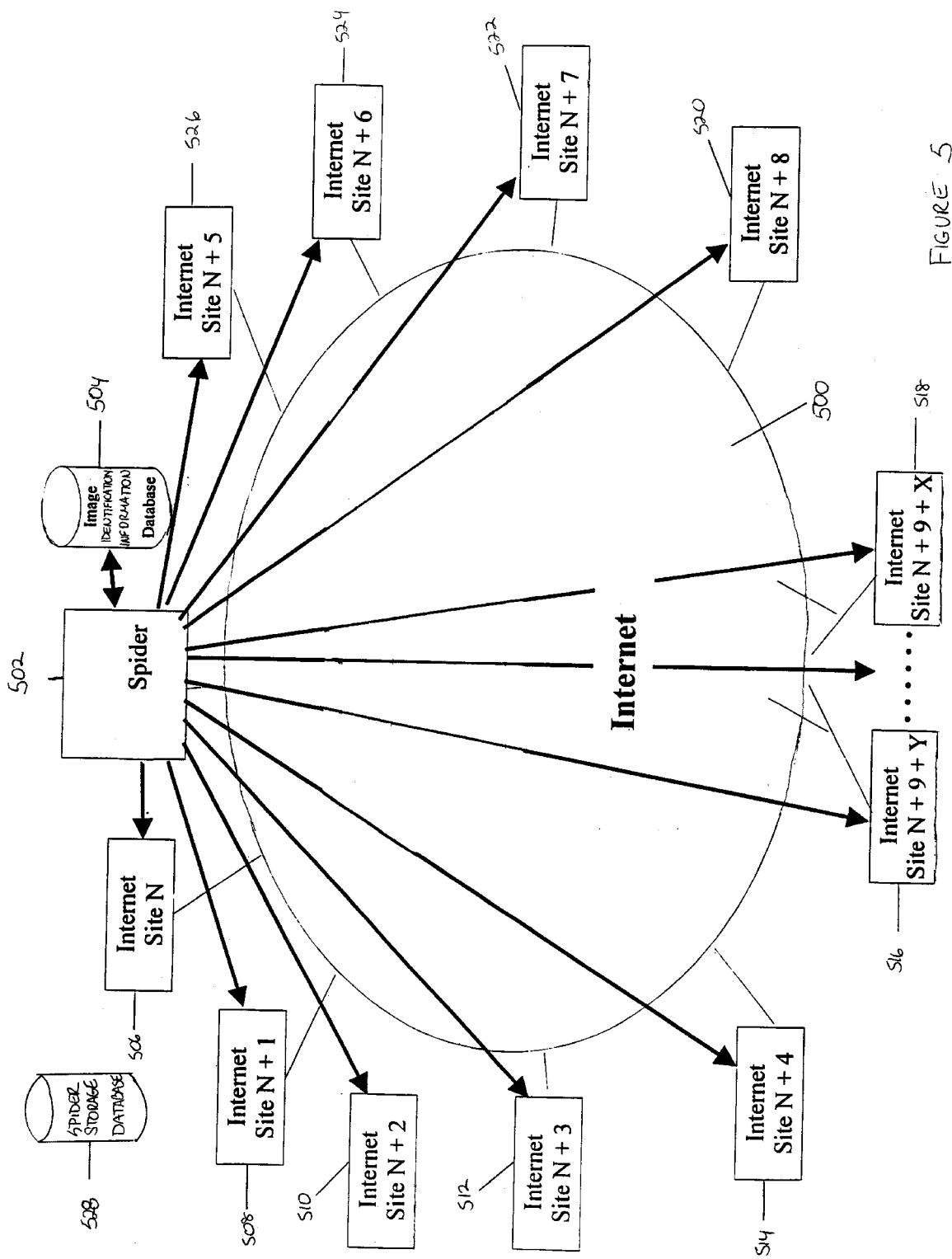
FIG. 5 is a diagram illustrating the use of a spider to search an electronic network according to one embodiment of the present invention.

An image retrieved using such spider or search engine can then be identified using the method of the present invention. The spider or search engine can be used to search an electronic network, such as the Internet, to seek out copies of an identified image. FIG. 5 is a diagram illustrating the use of a spider to search an electronic network according to one embodiment of the present invention.

In FIG. 5, a spider 502 according to the present invention is in communication with a database 504 that contains image identification information, also according to the present invention. The spider is also in communication with an electronic network, such as the Internet 500.

The spider is programmed to access different sites on the Internet 506, 508, 510, 512, 514, 516, 518, 520, 522, 524, 526. These sites can be selected by any appropriate means as described below in further detail. Images located by the spider can be retrieved and added to a database 528, identified and compared to image identification information from the database 504. Duplicate, copied, cropped, and transformed versions of the reference image can thereby be located and identified. The database 528 in which the spider stores retrieved reference information can be the same database as the image identification information database 504, or can be a separate database as illustrated in FIG. 5.

Figure 6:
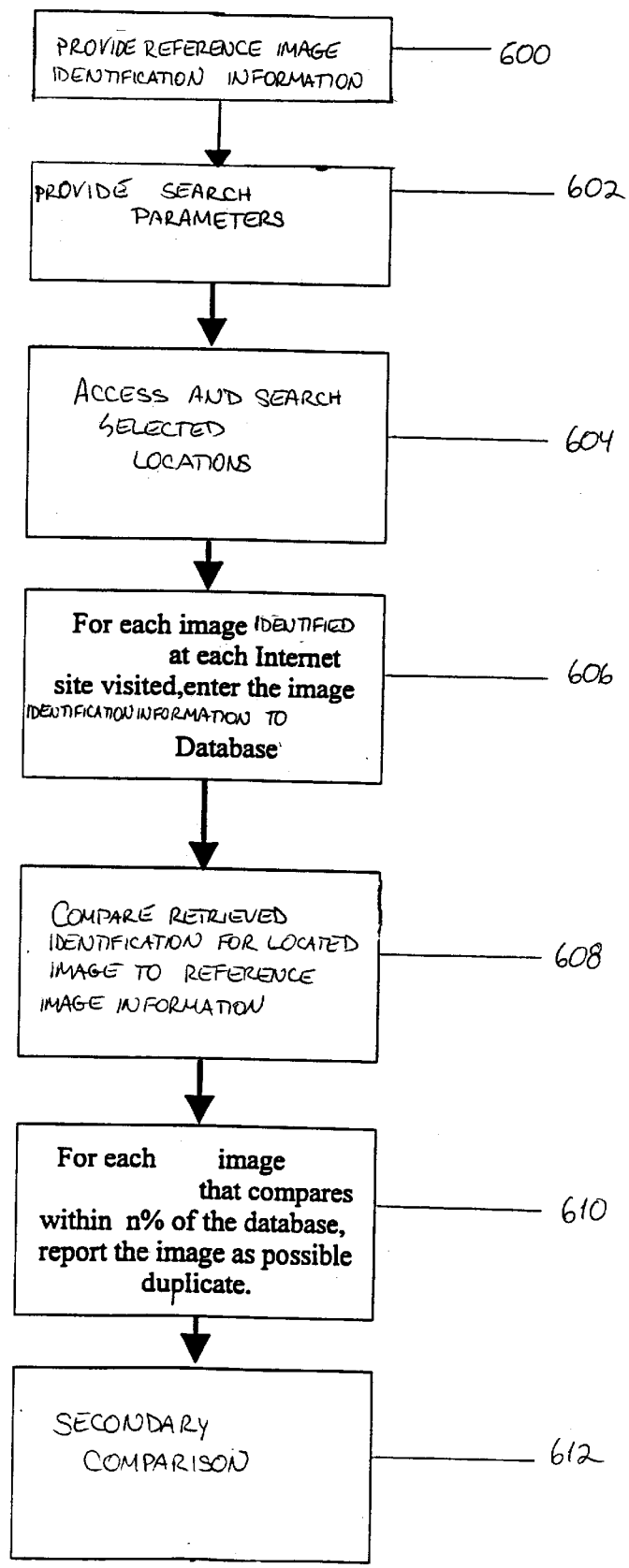
FIG. 6 is a flow chart illustrating the use of a spider software application according to one embodiment of the present invention.

FIG. 6 is a flow chart illustrating the use of a spider software application according to one embodiment of the present invention. In the Figure, the reference image identification information is provided to the spider 600. The search parameters, such as the Internet sites that the spider is to search are also provided to the spider 602. The spider then accesses and searches the selected search locations 604. The spider can be configured to, for example, locate and identify each image available on a visited site. The image identification can be performed either by the spider software application itself, or by another software application resident upon a computer to which the spider transmits a located image.

For each located image that is identified, the located image identification information is stored in a database 606. This located image identification information is compared to reference image identification information 608 for one or more images that is stored in the same or in a separate database.

A report indicating a possible duplicate image is generated for each located image whose identification information matches within a selected percentage of the reference image identification data 610. A secondary comparison can be performed on any such possible duplicate images located 612. For example, a possible duplicate image can be reloaded to the computer and compared to the reference image using pattern matching, quadrant frequency, usage counts, or any other applicable method. The results of the secondary comparison can then be reported.

In one embodiment, the spider or search engine is provided with an alarm or notification feature. Such features can include notifying an operator that an image match has occurred, notifying another party that an image match has occurred, and notifying the addressee of a particular site that an image(s) on that site matches an image(s) on another site. An alarm or notification can be visually displayed by using, for example, a text message, flashing display, color display, different font type or size, shading, borders, graying out, highlighting, animation, audio display, sound alarm, audibly broadcast message, and printed notice.

An alarm or notification can be stored for later retrieval, configured to display at particular times, or conditioned upon the occurrence of particular events. For example, the notification can be triggered to display every ten minutes, every time an image match is found, every time ten image matches are found, when no image match is found, to identify the total number of images on a site or electronic network, and to identify the total number or percentage of matching images or sites having matching images.

A search for duplicate images can be performed at the direction of user, or can be performed automatically. For example, the user can have a particular image identified and compared to an authenticated image to determine of the images are identical. Alternatively, the search engine or spider can be configured to search for and to determine the selected characteristics of am image or group of images. The spider or search engine can be programmed to locate all images at a particular site, locate images and identify only specific images, locate and identify all images at a particular site, compare located images with a predetermined identified image, and compare located images with each other to identify sites containing identical images.

An example illustrating one embodiment of the present invention is hereby provided as Example 1. In Example 1, an image in the RGB color space is identified and compared to another image to determine if the two images are duplicates. A duplicate image according to the present invention maintains a certain percentage of identity with the reference image. This percentage can vary according to the method of duplication, or according to whether the image was duplicated in its entirety.

According to one embodiment of the present invention, the closer the selected characteristics of the suspected duplicate image are to those of the reference image, the greater the amount of duplication of the two images. For example, a direct copy of an image file to another file of the same type and storage specifications would approach a 100% match of selected characteristics. However, a copy of an image file from, for example, the JPG format to the GIF format, a cropped copy, or a copy saved as a smaller JPG file could alter the selected characteristics. Therefore, the percentage of identity between the selected characteristics of the suspected duplicate image and the reference image would be less than 100%.

In one embodiment of the present invention, a set of predetermined criteria is used to ascertain whether a second image is a duplicate of a first image. Such criteria can include the percentage of identity of the determined characteristics of the compared image. Thus, if the determined characteristics are identical within the predetermined percentage, the images will be considered to be duplicates. The predetermined criteria can be adjusted to permit the identification of images that are identical in part, such as a clipped copy of an image compared to an original.

As an example, a comparison of two images to determine 100% identity of selected characteristics could be used to identify a direct copy of an image file to another file of the same type and storage specifications, as described above. Such a comparison might not identify an image copied to another format in which certain image characteristics are altered. However, a comparison to determine 80% identify of selected characteristics might be sufficient to identify such duplicate image stored in a different format.

In Example 1, four characteristics of the image composition are selected, Color Distribution, Color Space Usage, Color Range Distance, and Image Size. One skilled in the art will recognize that other amounts and types of image characteristics could be used to identify an image according to the present invention. For example, Image Depth could be a selected characteristic for a three-dimensional rendering, and Image Size might not be selected for standard image size databases. The steps performed in Example 1 can be performed in any suitable order. Steps can be combined and additional steps can be added to accomplish the image identification according to the present invention.

EXAMPLE 1

Image 1=Reference Image

Image 2=Comparison Image

I. Image Identification:

Number of Ranges for:

Color Distribution=32

Color Space Usage=32

Color Range Distance=32

Step 1: All colors used in the reference image are assigned to one of 32 different ranges in the RGB color space to generate the image Color Distribution, starting with white 255,255,255 and ending with black 0,0,0. For example, Range 1 is 255,255,255 through 247,0,0 and Range 2 =246,255,255. The remaining ranges are similarly determined.

Step 2: The percentage of color elements used by the reference image in each RGB color space range is generated.

Step 3: The percentage that each color range is used in the reference image in the RGB color space is generated.

Step 4: The average distance between the two farthest points of each color in a Color Range is generated for each Color Range.

Step 5: The image height and width for the specific selected display model is determined.

II. Image Comparison:

Step 6: Image Distribution Characteristic ("IDC")
a. For each Range defined for the IDC: Compare Image1, Ranges 1 through N to Image2, Ranges 1 through N.
b. Record the differences found in each of the comparisons of step 6a. Ranges not used by either image are ignored.
c. The image differences results are subtotaled for each range and totaled for all ranges. The total for all ranges is divided by the total number of ranges.

$$IDC = [((Image1, Range1) \div (Image2, Range1)) +$$
$$((Image1, Range2) \div (Image2, Range2)) +$$
$$\vdots$$
$$((Image1, RangeN) \div (Image2, RangeN))] \div N$$

Step 7: Image Usage Characteristic ("IUC")
a. For each Range defined for the IUC: Compare Image1, Ranges 1 through N Usage to Image2, Ranges 1 through N Usage.
b. Record the differences found in each of the comparisons of step 7a. Ranges not used by either image are ignored.
c. The image differences results are subtotaled for each range and totaled for all ranges. The total for all ranges is divided by the total number of ranges to derive the individual Usage Characteristic match for the two images.

$$IDC = [((Image1, Range1\ Usage) \div (Image2, Range1\ Usage)) +$$
$$((Image1, Range2\ Usage) \div (Image2, Range2\ Usage)) +$$
$$\vdots$$
$$((Image1, RangeN\ Usage) \div (Image2, RangeN\ Usage))] \div N$$

Step 8: Image Distance Characteristic ("IDIC")
a. For each Range defined for the IDIC: Compare Image1, Ranges 1 through N Distance to Image2, Ranges 1 through N Distance.
b. Record the differences found in each of the comparisons of step 8a. Ranges not used by either image are ignored.
c. Optionally weight distance. For each Range distance, multiply it by the IUC percentage of the corresponding Image1 Range (or by some other selected Usage factor). This procedure weights the distance to the relative use of its Color Range. Thus, when comparing one distance range to another, a distance whose representative color forms a larger percentage of the image will be weighted more heavily than a distance whose representative color forms a smaller percentage of the image.
d. The image differences results are subtotaled for each range and totaled for all ranges. The total for all ranges is divided by the total number of ranges to derive the individual Distance Characteristic match for the two images.

$$IDIC = [(((Image1, Range1\ Distance) \times (Image1, Range1\ Usage)) \div$$
$$(Image2, Range1\ Usage)) +$$
$$(((Image1, Range2\ Distance) \times (Image1, Range2\ Usage)) \div$$
$$(Image2, Range2\ Usage)) +$$
$$\vdots$$
$$(((Image1, RangeN\ Distance) \times (Image1, RangeN\ Usage)) \div$$
$$(Image2, RangeN\ Usage))] \div N$$

Step 9: Image Size Characteristic ("ISC")
a. For each Range defined for the ISC: Compare Image1, Ranges 1 through N Size to Image2, Ranges 1 through N Size.
b. Record the differences found in each of the comparisons of step 9a. Ranges not used by either image are ignored.
c. The image differences results are subtotaled for each range and totaled for all ranges. The total for all ranges is divided by the total number of ranges to derive the individual Size Characteristic match for the two images.

$$ISC = [((Image1, Range1\ Size) \div (Image2, Range1\ Size)) +$$
$$((Image1, Range2\ Size) \div (Image2, Range2\ Size)) +$$
$$\vdots$$
$$((Image1, RangeN\ Size) \div (Image2, RangeN\ Size))] \div N$$

Step 10: Average the four selected group characteristic differences to derive the Percent Probability ("PP") that Image2 is a copy of reference Image 1:

$$PP = (IDC + IUC + IDIC + ISC) \div 4$$

Depending upon the probability ranges selected for the comparison process, a PP of 100 can be considered to be a 100% match. PP ranges can be selected from 0% to 100%. Second level or above testing can be performed to confirm an image match. For example, one or both images can be re-analyzed using different characteristics, visually inspected, analyzed using pattern matching techniques to confirm such match. Such tests can be computer-implemented, performed by a person, or both.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

For example, the present invention can be used with data, images, libraries and files stored in any suitable file or data storage program including but not limited to Claris Filemaker, Microsoft's Office and Excel, and the database programs and applications of Lotus, Oracle Corporation, Informix, and Sybase.

What is claimed is:

1. A method for analyzing image information, comprising the steps of:

determining, as characteristics of a first image:
(a) the first image's color space usage,
(b) the first image's size,
(c) the first image's color range distance, and
(d) the first image's color distribution; and using the color distribution and at least one other characteristic of the first image to compare the first image to a second image;

wherein color distribution is defined by dividing color ranges into groups of N elements, wherein N is the total number of desired discrete elements.

2. A method for comparing a plurality of images, comprising the steps of:

determining, as characteristics of a first image:
(a) the first image's color space usage,
(b) the first image's size,
(c) the first image's color range distance, and
(d) the first image's color distribution; and using the color distribution and at least one other characteristic of the first image to compare the first image to a second image;

determining the color distribution and the at least one other characteristics for the second image;

comparing the determined characteristics of the first and second displayed images; and using a set of predefined criteria to determine whether the determined characteristics of the first displayed image match the determined characteristics of the at least a second displayed image.

3. The method of claim 1, wherein the determination of the image's color distribution further comprises the steps of:

defining all possible display ranges for a pixel of a selected color space;

dividing the ranges into groups of N elements, wherein N is the total number of desired discrete finger print elements;

determining the color value for each pixel in the image; and determining the number of expressed color values in each group of N elements for which there is at least one pixel with a corresponding color value.

4. The method of claim 3, further comprising the step of, for each group of N elements, dividing the number of expressed color values of the group with the total number of color values for all groups.

5. The method of claim 3, further comprising the step of combining a plurality of color values as a single expressed color value.

6. The method of claim 5, wherein the plurality of color values are combined by grouping colors that cannot be visually distinguished.

7. The method of claim 5, wherein, in an RGB color space, the plurality of color values are combined by truncating a specified number of the lower bits representing one or more component colors of a first color value;

determining the value of the component colors of the first color value after the truncation; and combining the first color value with any other color values whose color components are equal in value to the value of the component colors of the first color value after the truncation.

8. The method of claim 1, wherein the determination of the image's color space usage further comprises the step of for each color range defined in the image's color space, counting the number of pixels that use a color element in the color range.

9. The method of claim 8, further comprising the step of, for each specific color range of the color space, dividing the total number of pixels using a color element in the color range by the total number of pixels used in the image to generate the percentage of usage for each specific color range of the color space.

10. The method of claim 1, wherein the determination of the image's color space distancing further comprises the steps of:

determining the distance between the two farthest points of the color element for each color element of a color range defined in the image's color space; and averaging the total distances for all color elements in the color range.

11. The method of claim 1, wherein the determination of the image's color space sizing further comprises the step of determining the width and height of the image.

12. The method of claim 1, further comprising the step of comparing at least one determined image characteristic of a first image with the determined image characteristic of at least a second image.

13. The method of claim 12, further comprising the step of determining whether the first image is identical to the compared second image.

14. The method of claim 1, wherein the determination of the selected characteristic for a displayed image is computer-implemented.

15. The method of claim 2, wherein the set of predetermined criteria includes the percentage of identical characteristics.

* * * * *